May 17, 1927.  
J. A. PIPER  
1,629,360  
HEADLIGHT ADJUSTER FOR AUTOS  
Filed Sept. 27, 1926   3 Sheets-Sheet 1

Joseph A. Piper, INVENTOR  
BY Victor J. Evans, ATTORNEY  
WITNESS:

May 17, 1927.
J. A. PIPER
1,629,360
HEADLIGHT ADJUSTER FOR AUTOS
Filed Sept. 27, 1926   3 Sheets-Sheet 2
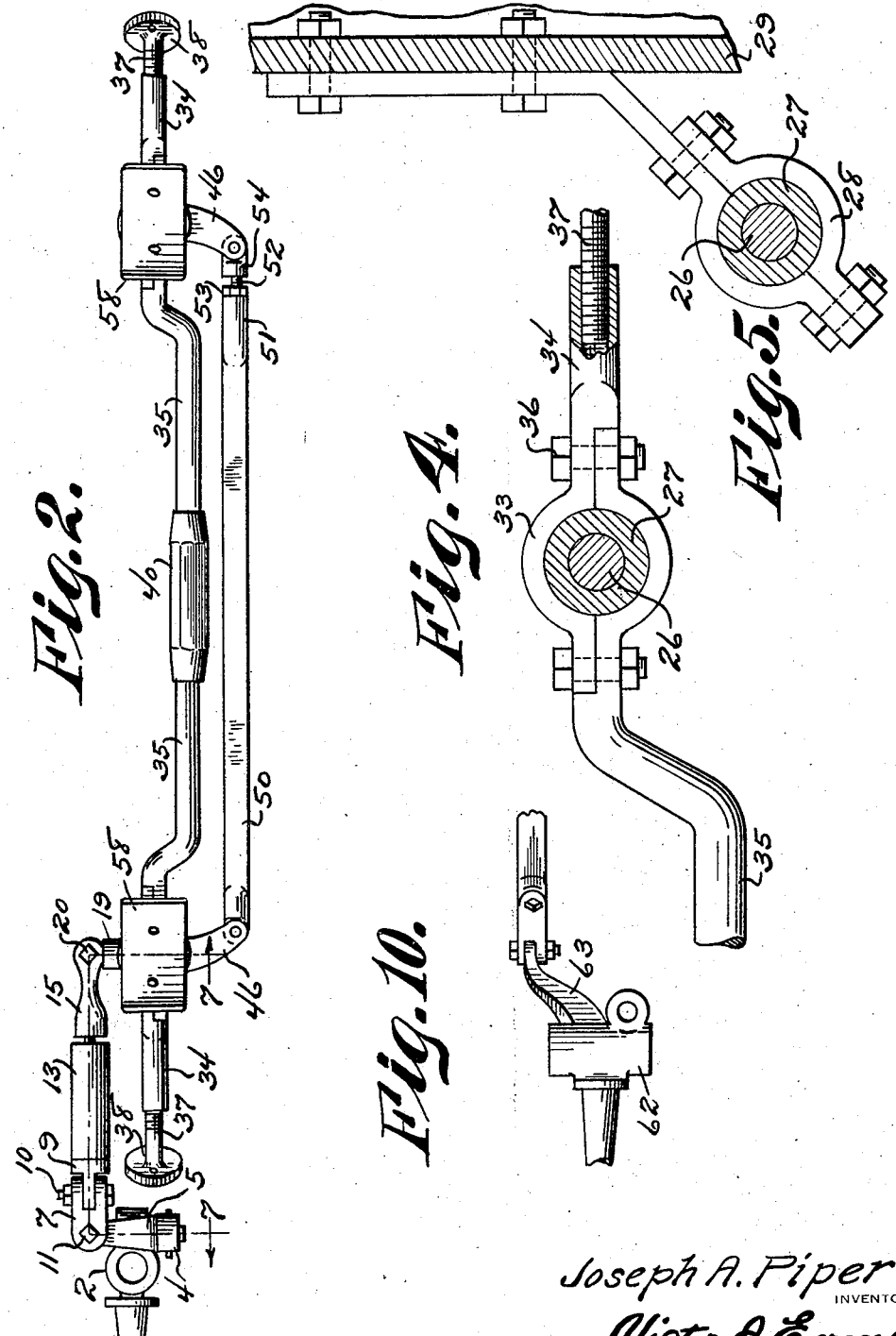
Joseph A. Piper
INVENTOR
BY Victor J. Evans
ATTORNEY
WITNESS

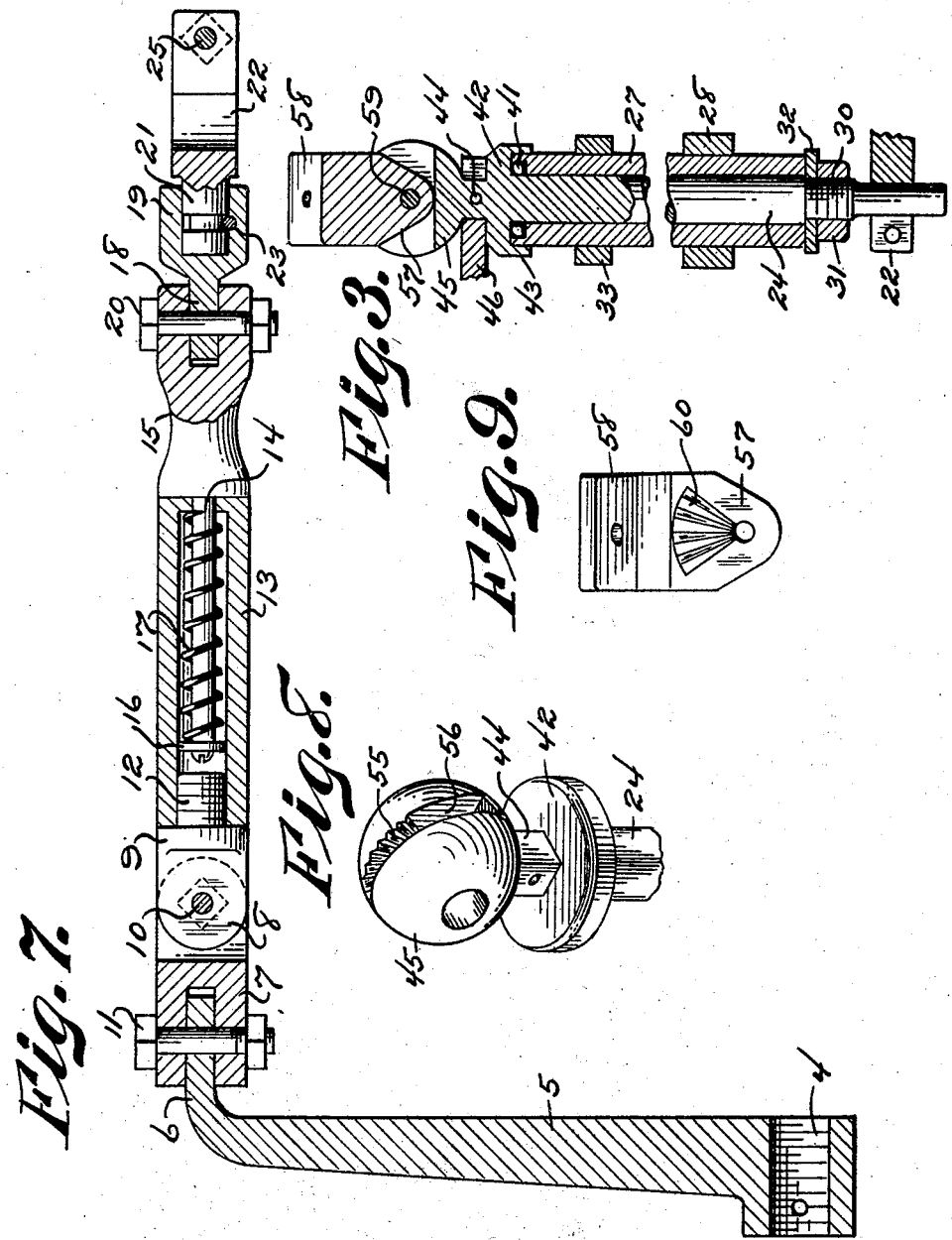

Patented May 17, 1927.

1,629,360

UNITED STATES PATENT OFFICE.

JOSEPH A. PIPER, OF WILEY FORD, WEST VIRGINIA, ASSIGNOR OF ONE-HALF TO LOUIS SETTLE, OF CUMBERLAND, MARYLAND.

HEADLIGHT ADJUSTER FOR AUTOS.

Application filed September 27, 1926. Serial No. 137,974.

My present invention aims the provision of a dirigible headlight for automobiles.

My object is to provide an extremely simple but thoroughly effective means whereby the headlights will be caused to turn simultaneously with and in the same direction as the turning of the steering wheels of an automobile and further wherein the head lamps may be swung and sustained at desired angles so that the rays of light therefrom may be directed downwardly onto the ground surface ahead of the machine.

A further object is the provision of a dirigible headlight for automobiles, wherein the head lamps are tiltable to direct the rays of light therefrom at varying desired angles and wherein the headlights are effectively supported in a manner whereby the same will not be affected by vibration to which the automobile may be subjected.

To the attainment of the above broadly stated objects the improvement further consists in certain other novel features of construction, combination and operative association of parts, a satisfactory embodiment of which is disclosed by the accompanying drawings.

In the drawings:

Figure 2 is a top plan view thereof.

Figure 3 is a sectional view approximately on the line 3—3 of Figure 1.

Figure 4 is a sectional view approximately on the line 4—4 of Figure 1.

Figure 5 is a sectional view approximately on the line 5—5 of Figure 1.

Figure 7 is an enlarged sectional view approximately on the line 7—7 of Figure 2.

Figure 8 is a perspective view of the ball head of the lamp post.

Figure 9 is a side elevation of one of the lamp brackets.

Figure 10 is a fragmentary elevation showing the body of the axle spindle formed with an arm to which the throw means of the improvement is attached.

Figures 1, 6:
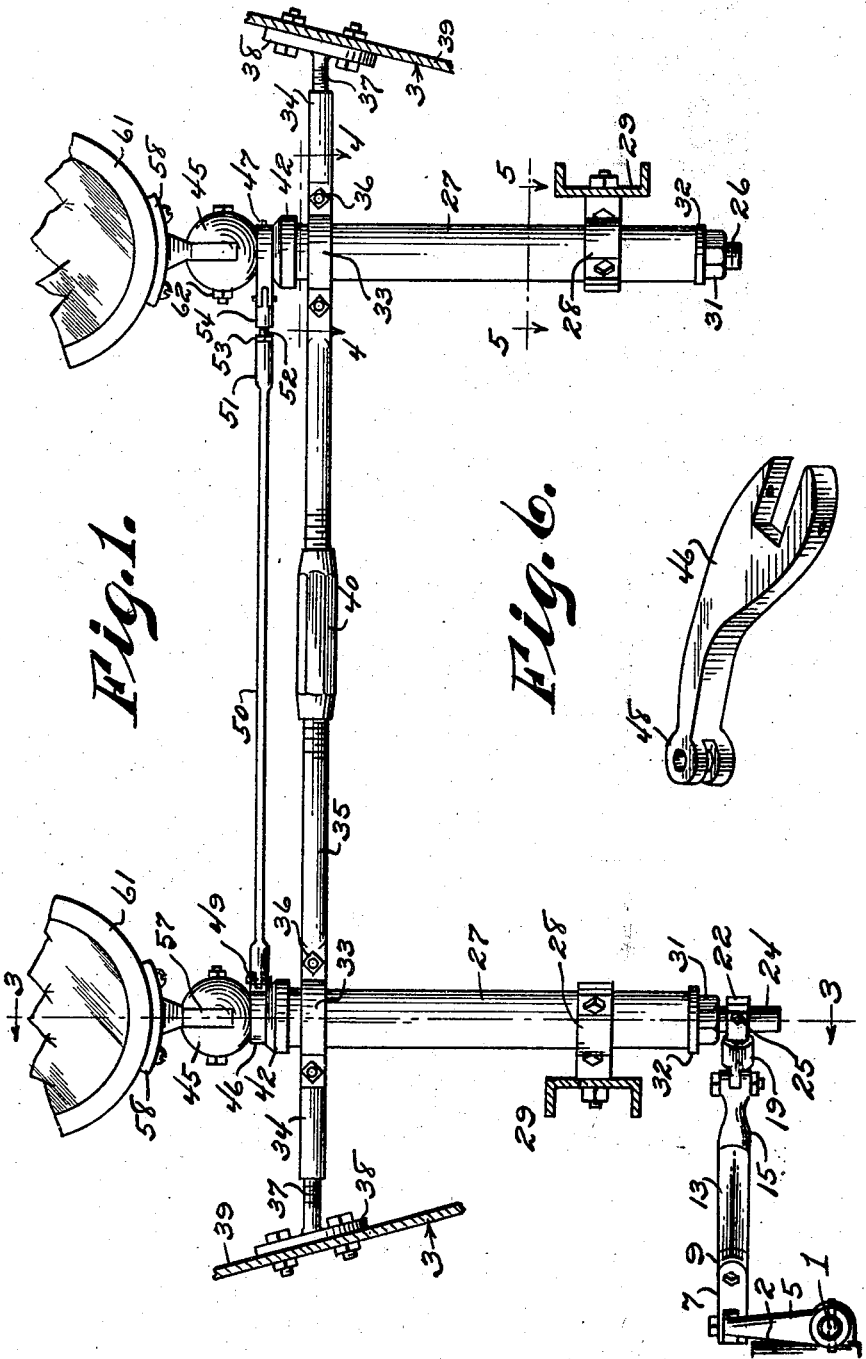
Figure 1 is a front elevation illustrating the application of the improvement, parts being in section.
Figure 6 is a detail perspective view of one of the members that is secured to the lamp post and pivotally connected to the brace rod.

The binding nut 1 for the axle spindle body 2 of an automobile 3 is screwed in a threaded socket 4 in one end of an arm 5. Suitable means, such as a pin, is passed through the bolt 1 and the socket 4 for effectively holding the arm 5 properly positioned on the spindle body. The arm 5 has an offset end 6 that is received in and pivotally secured to the bifurcated end of a link 7. The second or outer end of the link is slotted or bifurcated at an opposite angle to that in which the end 6 of the arms 5 is received and pivoted, and pivotally received in the last mentioned bifurcated end of the link there is an ear 8 formed on the end of a stud carrying element 9. The element 9 is permitted to swing upwardly with respect to the link 7, as the pivot 10 between these members are arranged horizontal, while the vertically disposed pivot 11 between the end 6 of the arm and the link 7 permits of a horizontal swinging of the link and the member 9 that is carried by the link. The stud 12 of the member 9 is threaded and is screwed in the bore of a sleeve 13. The outer end of the sleeve is partly closed but is formed with a central opening through which passes a rod 14 that is attached to the inner end of what I will term a head member 15. Removably fixed on the inner end of the rod 14 there is a disc 16, and arranged around the rod and contacting with the disc and with the outer end wall of the sleeve 13 there is a coil spring 17.

The outer end of the head member 15 has a central transverse opening therethrough to receive therein an ear 18 formed on a comparatively short socket member 19. The ear 18 is pivoted in the head, as at 20. The socket member 19 has its ear 18 horizontally disposed, and received in the bore of the socket there is a stub shaft 21 formed on one end of a split clamp 22. The stub shaft 21 has an annular groove therethrough and passing transversely through the socket and received in this groove there is a pin 23. By such arrangement it will be noted that the clamp 22 is revoluble in the socket 19 and also that the socket is swingable horizontally on the head 15. The clamp 22 is designed to engage with the lower end of a lamp post 24, the split ends of the clamp being connected by a binding element 25. As far as the description has progressed it will be noted that all the elements herein recited are removably associated.

A second lamp post 26, of a less length than the post 24 is also employed. Both of the posts 24 and 26 pass through guide sleeves 27 that are engaged by clamps 28 that are bolted or otherwise fixedly but removably secured to the channeled side members 29 of the frame for the automobile 3. The clamps 28 are preferably in the nature of split or sectional members which are removably associated by bolts or like elements, and the said clamps hold the sleeves 27 in vertical position, it being, of course, understood that one of the sleeves and one of the lamp posts are disposed at the front and adjacent to the opposite sides of the vehicle. The lower ends of the posts 24 and 26 are reduced, and both of the posts at or adjacent the said reduced portions are threaded, as at 30. These threaded portions 30 are engaged by nuts 31 that contact with washers 32 which engage the ends of the thicker portions of the posts that are received in the sleeves 27, and thereby hold the posts from vertical movement through the said sleeves.

The guide sleeves 27 adjacent to their upper ends are engaged by semi-circular clamping members substantially similar to the clamps 28, the first mentioned clamps being illustrated in detail by Figure 5 and the last mentioned clamps being most clearly shown by Figure 4. These last mentioned clamps 33 are formed respectively on the ends of a socket member 34 and the offset end of a rod 35. The confronting faces of the members 34 and 35 are reduced to receive therein the reduced angle extensions of the rounded semi-circular elements that constitute the clamp 33, and passing through these extensions and reduced portions there are removable binding means 36. Before application the clamp section carrying the socket 34 has screwed therein a rod or bolt 37 fixed on and extending from a headed element 38 that is riveted or otherwise secured to the inner faces of the front fenders and mudguards 39 of the automobile. Of course, the socket members extend toward the mudguards and the rods 35 are directed toward each other. The rods 35 have their confronting ends spaced and are provided with opposite hand pitched threads for engagement by a turnbuckle 40. By an arrangement as just described it will be noted that the elements constituting the upper support for the sleeves are removably and adjustably associated, this being true with respect to the throw means first described, permits of the application of my improvement upon varying types of automobiles. Also it is to be noted that the construction as described may have the parts constituting the same easily associated and readily applied to the frame and to the mudguards of the machine.

Each guide sleeve 27 has an annular depression at its outer end, the same which provides a race-way for anti-frictional balls 41. These anti-frictional elements 41 contact with the inner walls of annular enlargements or flanges 42 formed on the respective lamp posts. Each flange has a downwardly directed annular skirt 43 that surrounds the upper portion of the respective sleeves 27. Above the flange 42 each lamp post is formed with a reduced and what I will term neck extension 44 and with a ball head 45 at the outer end of the said neck 44. The necks 44 receive the bifurcated ends of plates 46 best illustrated by Figure 6 of the drawings. A holding pin 47 passes through the arms provided at the mentioned bifurcated ends of the plates 46 and the second and inner ends of the said plates are bifurcated to provide the same with spaced ears 48. Pivotally secured between the ears of one of the plates 46 there is a tongue 49 formed on one end of a rod 50. The second or outer end of the rod is thickened to provide the same with an interiorly threaded socket member 51. Screwed in the socket member 51 of the rod 50 there is a bolt member 52. This bolt has screwed thereon a nut 53 which contacts the outer end of the socket member 51. The bolt may be screwed inwardly or fixed on a rod section 54 that has a reduced tongue that is received between and pivotally secured to the ears 48 of the second plate 46. By this arrangement it will be seen that when the throw means is operated by the turning of the wheel to which the axle spindle of the body 2 is connected the post 24 will be turned and the rod connection between this post and the post 26 will cause both of the posts to be turned in unison.

The ball head 45 of each lamp post is longitudinally slotted, and the confronting walls thus provided are formed with outwardly projecting radially disposed teeth 55. Received in the slotted or bifurcated portion of the head 45 of each post there is the reduced central depending member or shank 57 of a lamp bracket 58. A pivot 59 secures the shank 57 in the slots 56, the said pivot being in the nature of a bolt that is engaged by a nut. The opposite faces of the shanks 57 of the brackets 58 are provided with outwardly directed radially disposed teeth 60 to coengage between the teeth 55 in the bifurcated heads 45.

The brackets 58 are in the nature of arched plates and these plates are bolted or otherwise removably secured to the head lamp housings 61.

By mounting the head lamps on the posts, in a manner as above described, it will be apparent that by partly unscrewing the nuts 62 for the pivots 59 the shanks 57 of the brackets 58 will be swung to arrange the lamp housing at any desired angle with respect to the posts and by screwing home the said nuts the housings will be positively sustained to direct the rays of light therefrom at such desired angles. It is, of course, to be understood that the heads 45 of the posts embody a natural resiliency which permits of the spreading or compression thereof and as a matter-of-fact, the sides provided by the bifurcated heads preferably spring toward each other.

With my improvement it will be seen that I mount the head lamps in such a manner as to positively insure the simultaneous turning of both lamps with and in the direction of the turning of the front or steering wheels of the automobile. It will be noted that the lamp posts, being journaled for the major portion of their lengths through the sleeves 27 will be effectively supported against distortion, and further that the said posts will freely turn in the sleeves incident to the anti-frictional bearings between these elements. The throw means is of such construction and so associated between the axle spindle housing body and the lamp post 24 as to absorb any shocks or jars either in a lateral or vertical direction so that such shocks or jars will not be imparted to the posts 24 and consequently the post 26 will likewise not be effected by such jars. The construction is comparatively simple, that is, adjustable so that the same may be attached to varying widths of automobiles. While it is believed that the foregoing description when read in connection with the accompanying drawings will fully set forth the simplicity and advantages of my construction I do not wish to be restricted to the precise structure herein set forth and, therefore, hold myself entitled to make such changes therefrom as fairly fall within the scope of what I claim. For instance, and as disclosed by Figure 10 of the drawings I may form the axle spindle body 62' with an integral arm 63, similar to the arm 5 and rearwardly and upwardly directed from the spindle body 62'. The arm 63 has its outer end pivotally connected to the link 7 of the throw mechanism, and the throw mechanism is similar to that previously described.

Obviously the connecting means between the lamp post and the spindle may be arranged on the right hand side of the machine instead of on the left hand side, as illustrated in the drawings. Such means may be connected to both spindles so that the separate lamps will be operated by the separate spindles. If desired, a connection whereby both lamps will turn in unison may be provided between the depending ends of the lamp posts, in which instance, a single connecting means between one of the spindles and one of the posts is provided for.

Having described the invention, I claim:—

1. The combination with an automobile, of dirigible head lamps therefor, a post for each head lamp, a supporting sleeve through which each post passes, means for adjustably connecting the sleeves to the sides of the frame and to the front mud guards of the automobile, adjustable means connecting the respective posts, throw means connected with one of the posts, said means including an arm on one of the axle spindle bodies for the automobile and pivotally associated swingable elements connected to the arm and to the said posts.

2. The combination with an automobile, of dirigible head lamps therefor, a post for each head lamp, a supporting sleeve through which each post passes, means for adjustably connecting the sleeves to the sides of the frame and to the front mud guards of the automobile, adjustable means connecting the respective posts, throw means connected with one of the posts, said means comprising a member clamped on the post, a bifurcated head to which the member is pivoted, a stem extending longitudinally from the head, a sleeve in which the stem is received, spring means between the sleeve and stem influencing the head in the direction of the stem a member having an end removably and adjustably secured in the sleeve, a link having its ends bifurcated in opposite directions, and in one of which bifurcations the said member is pivoted and an arm secured to the body of the axle spindle of one of the front wheels of the automobile and pivotally secured in the bifurcated end of the link.

3. In combination with an automobile, of dirigible lamps therefor, including bearing sleeves, means clamping the bearing sleeves on the channeled side members of the automobile frame, means supporting the sleeves adjustably connected to the front mud guard of the automobile, a lamp supporting post finding a bearing in and extending through each sleeve, pivoted connecting means for the posts, means holding the post from longitudinal movement, an arm on one of the posts, and pivotally associated means connecting the arm to one of the spindle bodies of the automobile.

4. In combination with an automobile, of dirigible headlamps therefor, including bearing sleeves, sectional clamping means supporting the sleeves on the side channel bars of the automobile, an upper support for the sleeves, including a plate having circular bearings through which the sleeves pass, brackets fixedly secured on the mud guards of the automobile, interengaging means between the brackets and the ends of the plate, means adjustably securing the plate to the brackets, a lamp supporting post finding a bearing and extending through the respective sleeves, pivoted connecting means for the posts, means holding the posts from longitudinal movement, an arm secured to the lower end of one post and pivotally associated means connecting the arm to one of the spindle bodies of the automobile.

5. In combination with an automobile, of dirigible lamps therefor, including vertically disposed bearing sleeves, removable means clamping the bearing sleeves on the channel side bars of the automobile, a support for the upper ends of the bearing sleeves removably secured thereto and adjustably secured to the front mud guards of the automobile, a lamp supporting post finding a bearing in each sleeve and extending therethrough, anti-frictional bearings between the posts and sleeves, connecting means for the posts, an arm secured to the lower end of one of the posts and pivotally associated means connecting the arm to one of the spindle bodies of the automobile.

6. In combination with an automobile, of dirigible lamps therefor, including bearing sleeves, means secured to the sides of the frame and to the front mud guards of the automobile supporting said sleeves, a lamp post received through each sleeve, each of said posts having a bifurcated head whose inner walls are toothed radially, a neck extending from the head, an annular flanged enlargement at the terminal of the neck which rests on and has its flange arranged around the respective sleeves, anti-frictional bearings between the sleeves and the last mentioned parts of the post, arms secured on the necks of the posts and extending outwardly therefrom, a rod comprising adjustably associated sections having its ends pivoted to the respective arms, means on the lower ends of the post holding the same from longitudinal movement through the sleeves, lamp housing brackets having toothed shanks which are received respectively in the bifurcated heads of the post, pivoted binding means holding the shanks in the heads, an arm on the lower end of one of the posts, an arm on the spindle body, elements pivotally secured to the respective arms, and a connecting member pivotally secured to said elements.

In testimony whereof I affix my signature.

JOSEPH A. PIPER.